Feb. 14, 1961 W. K. SCHMID 2,972,094
VARIABLE SPEED ASYNCHRONOUS MOTOR
Filed June 29, 1954 5 Sheets-Sheet 1

INVENTOR
Wolfgang Karl Schmid

BY *George M. Spencer*

ATTORNEY

Feb. 14, 1961 W. K. SCHMID 2,972,094
VARIABLE SPEED ASYNCHRONOUS MOTOR
Filed June 29, 1954 5 Sheets-Sheet 2

INVENTOR
Wolfgang Karl Schmid
BY George M. Spencer
ATTORNEY

Feb. 14, 1961  W. K. SCHMID  2,972,094
VARIABLE SPEED ASYNCHRONOUS MOTOR
Filed June 29, 1954  5 Sheets-Sheet 3

INVENTOR
Wolfgang Karl Schmid

BY George H. Spencer

ATTORNEY

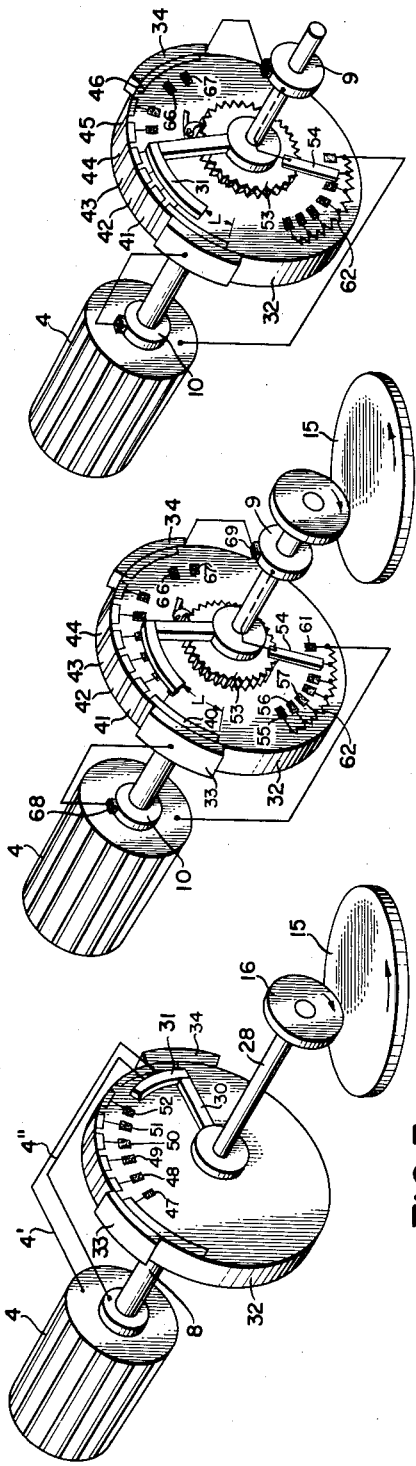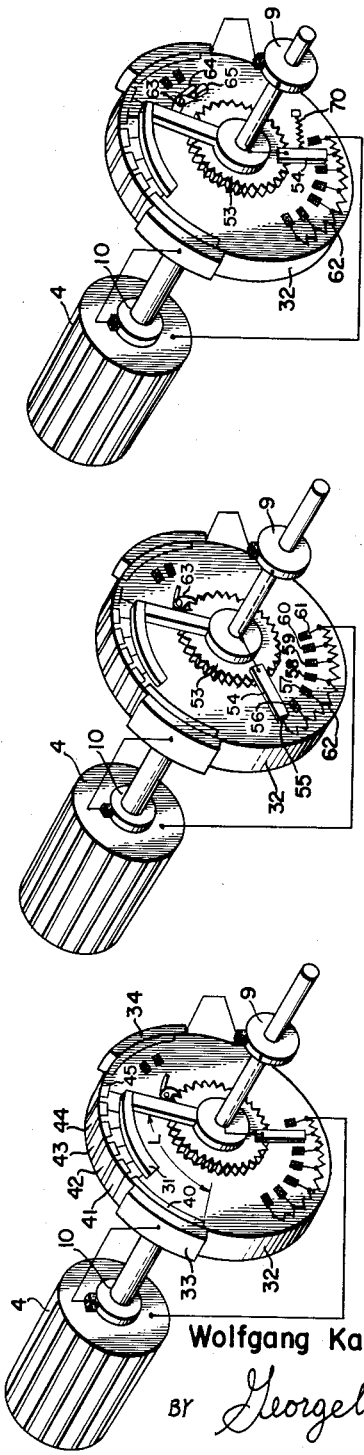

Feb. 14, 1961 W. K. SCHMID 2,972,094
VARIABLE SPEED ASYNCHRONOUS MOTOR
Filed June 29, 1954 5 Sheets-Sheet 5

INVENTOR
Wolfgang Karl Schmid

BY George H. Spencer

ATTORNEY

_United States Patent Office_

2,972,094
Patented Feb. 14, 1961

2,972,094

VARIABLE SPEED ASYNCHRONOUS MOTOR

Wolfgang Karl Schmid, 20 Ave. des Bleuets,
Gagny, Seine-et-Oise, France

Filed June 29, 1954, Ser. No. 440,163

Claims priority, application Germany June 29, 1953

3 Claims. (Cl. 318—232)

The present invention relates to an electromagnetically controlled driving mechanism, and more particularly to a mechanism in which the rotation of the driven member may be varied.

U.S. patent applications, Serial Nos. 326,395, now abandoned, and 410,694, now abandoned, filed December 27, 1952, and February 16, 1954, respectively, relate to electromagnetically controlled driving mechanisms in which the rotation of the driven member can be varied from zero to the maximum velocity of the drive motor.

This is accomplished, according to the second of the above applications, by means of a control motor having an armature rotating in a stator of the three-phase alternating current type. The winding of this armature can be interruptedly short-circuited and the length of the short-circuiting current pulses can be varied or controlled so that the rotating field acting on the armature and causing its rotation will also be influenced by these current pulses. Thus, the speed of the armature is controllable by the length of the current pulses which can be readily varied. According to a further embodiment of the same application, a continuous rotation will be assured in case of low speeds, if resistors are inserted in the circuit of the armature winding.

The present invention is a further development and improvement of the aforementioned control system.

The following description discloses further improvements of this variable-speed motor which aims at a simplification of the design thereof and an improved adaptation of the pulses and the armature resistances to the power and number of revolutions required in the case under consideration. If, for instance, a small armature or a short-circuiting ring is rotatably arranged by means of a ball bearing on the armature shaft, the former can cause the drive of a friction disc mounted in the motor. By means of a hand wheel arranged on the motor the desired number of revolutions of the variable-speed motor can be adjusted. In this manner it is possible to mount the variable-speed motor, the pulse transmitter, and the friction wheel drive within the motor casing. Furthermore the invention discloses solutions of the problems relating to the design of the device for the pulse and resistance control which render possible an improved adaptation of the variable-speed motor to the given requirements. If, for instance, the numbers of revolution of the variable-speed motor are below the set value thereof owing to fluctuations of the load, the periods of the short-circuit impulses of the armature have to be lengthened automatically. If the number of revolutions of the motor is higher than the desired value the switching-in periods of the short-circuit impulses have to be shortened automatically. Furthermore the invention teaches how to provide a resistance control device independently of this control device, said resistance control device becoming effective whenever the armature carries out jerky motions, i.e. does not rotate continuously at the same speed.

The present invention will now be more fully described with reference to the accompanying drawings showing, by way of example, some embodiments of the present invention. In the drawings—

Figs. 3, 3a and 3c–3f are perspective views of the motor shown in Fig. 2 and the parts associated therewith in different operating positions;

Figure 1:
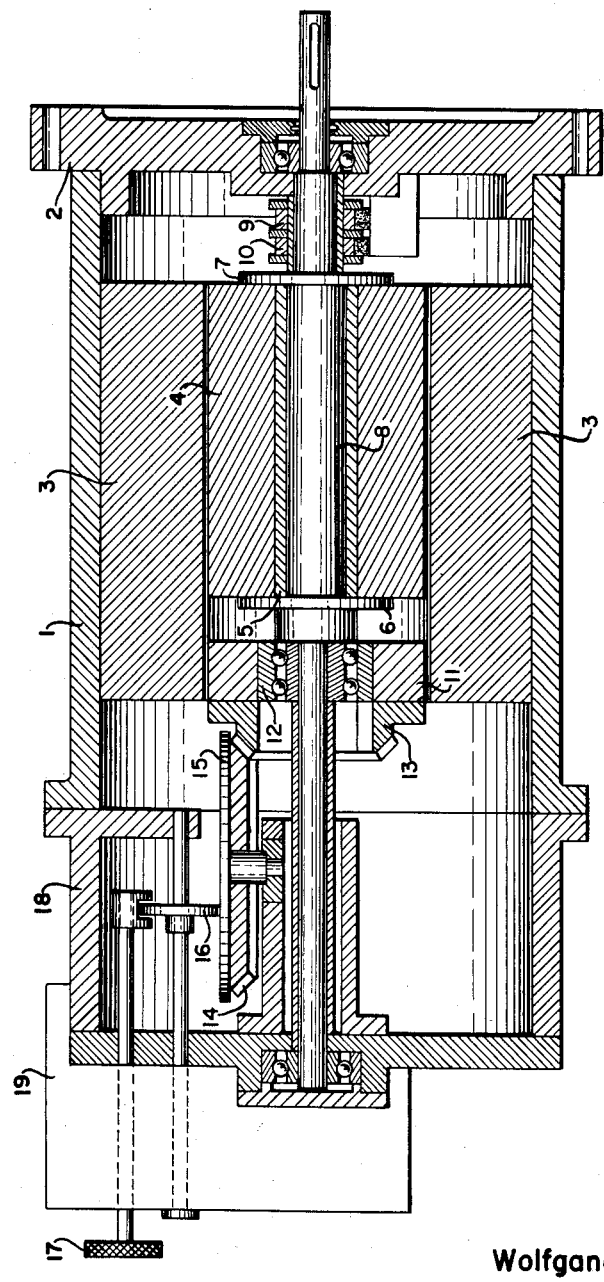
Fig. 1 is a sectional elevation of a variable-speed motor according to the invention.

Referring now to the drawings and first to Fig. 1 showing the structural design of the variable-speed motor, the motor casing or housing 1 is provided at both sides with a flange. The right flange 2 serves for securing the motor to a machine or engine (not shown). The laminations 3 of the stator are arranged in the motor casing 1 and are somewhat longer than the armature 4 consisting of a pack of dynamo laminations provided with grooves arranged on a Bakelite jacket 5. At the two sides of the armature 4 are arranged, respectively, discs 6 and 7 by which the laminations of the armature 4 are compressed and rigidly connected with a shaft 8. The armature 4 carries a winding (not shown) having ends (not shown) connected with the two slip rings 9 and 10, respectively. At the left side of the armature 4 a short circuit ring 11 is provided which is rotatably connected by means of a ball bearing 12 to the motor shaft 8. This ring 11 may be in the form of a squirrel cage rotor of a type well known in the art. A bevel gear 13 is secured to the short circuit ring 11 and drives a bevel gear 14 and a friction disc 15 rigidly attached thereto. A friction wheel 16 abuts against the friction disc 15 and allows to adjust the desired set number of revolutions. The more the friction wheel 16 is approached to the outer edge of the friction disc 15 the faster it is rotated. This displacement of the friction wheel 16 is effected by a hand wheel 17. By means of the friction wheel 16 a control device (not shown) is actuated which is arranged in and housed in a box 19 secured to a hollow part 18 connected to the casing 1. The operation of this motor is principally the same as that in Fig. 2, which will be described in the following.

Figure 2:
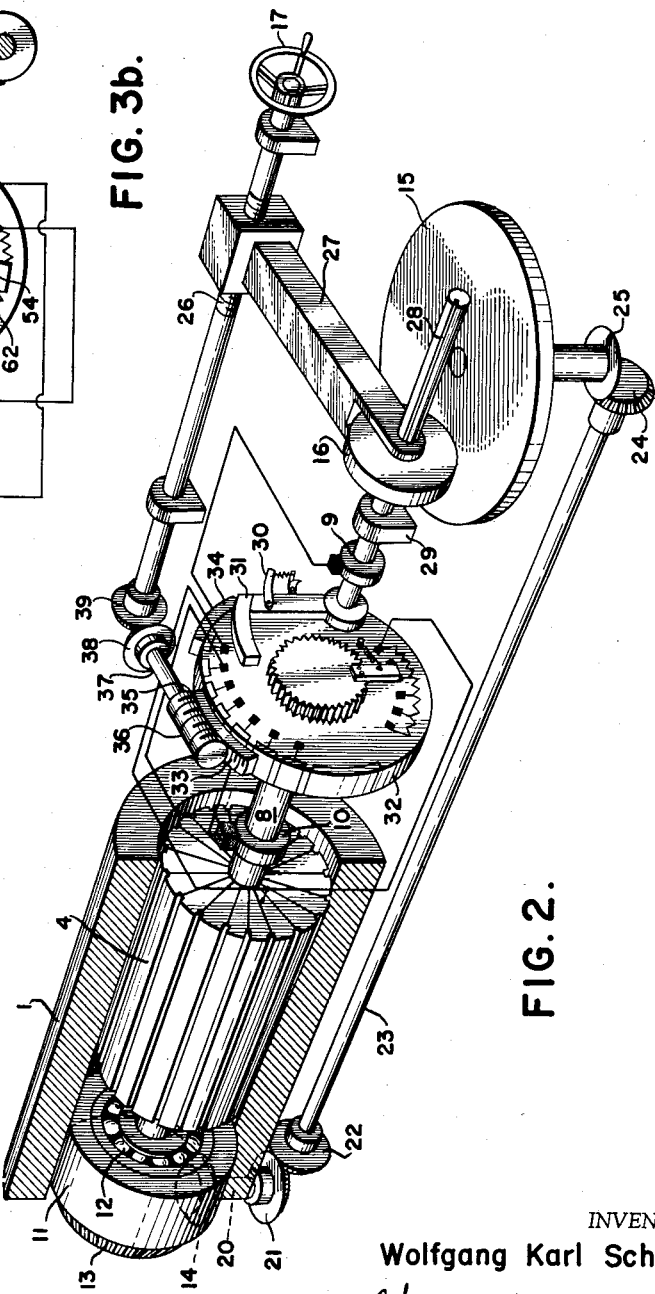
Fig. 2 is a perspective view of a similar embodiment of this invention as that in Fig. 1.

Referring now to Fig. 2 showing a perspective view of another embodiment of this invention, namely of a similar motor as that illustrated in Fig. 1, the operation of which will be explained in detail hereinafter, the motor casing 1 is shown cut open, the armature 4 being arranged in the same and secured to the shaft 8. The short-circuit ring 11 is arranged on the ball bearing 12 and thus can be rotated independently of the shaft 8. The bevel gear 13 is rigidly connected to the short-circuit ring 11 and drives the bevel gear 14 rigidly connected to a shaft 20 which drives over two bevel gears 21 and 22 a shaft 23 driving over bevel gears 24 and 25 the friction disc 15 being in operative connection with the friction wheel 16 which is adjustable by the hand wheel 17 over a threaded spindle 26 and an arm 27 holding the friction wheel 16. The more the friction wheel 16 approaches the center of the friction disc 15 the lesser is the number of revolutions per minute of the friction wheel 16. The friction wheel 16 is slidably connected by a key (not shown) to a shaft 28 supported by a bearing block 29. At the left end of the shaft 28 the slip ring 9 is arranged as well as a lever 30 carrying a sliding segment 31. The slip ring 10 is rigidly connected with the armature shaft 8. On the right end of the shaft 8 is furthermore arranged a Bakelite disc 32 on which are arranged contacts (more fully to be described hereinafter) for the automatic pulse control, and the device for automatically adapting a resistor (also more fully to be described hereinafter). At the circumference of the Bakelite disc 32 of a periodic current interrupter more fully to be described hereinafter, two copper segments 33 and 34 are arranged so as to be supported by same. The segment 34 is stationary in space whereas the segment 33 carries a toothed gear 35 engaging a worm 36. The segment 33 is so guided that by a rotation of the shaft 37 connected with the worm 36 the distance of the two segments 33 and 34 can be adjusted. The shaft 37 is rotated over bevel gears 38 and 39 by the spindle 26. Thus it will be understood that a rotation of the hand wheel 17 allows to adjust simultaneously the friction wheel 16 and the distance of the two segments 33 and 34 from each other.

Figure 2A:
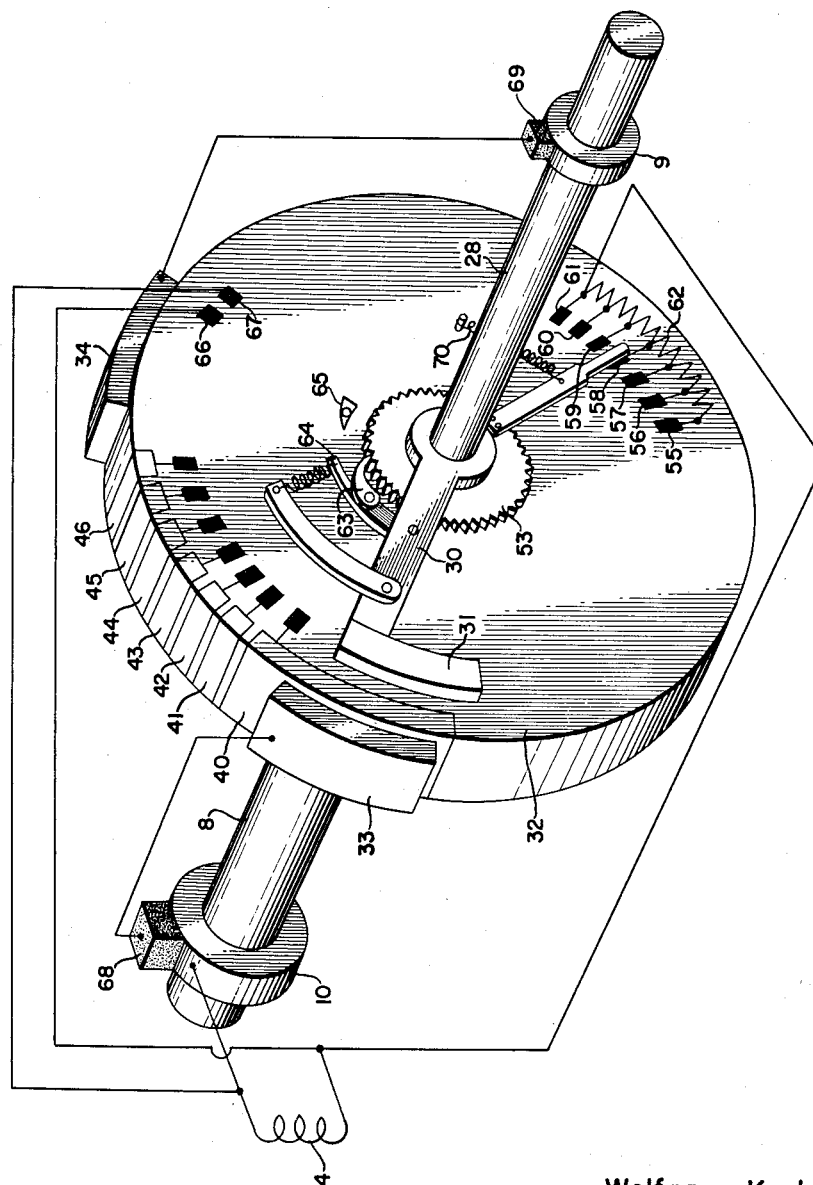
Fig. 2a is a perspective view on an enlarged scale of a part shown in Fig. 2.

Fig. 2a shows the periodic current interrupter in detail. A metal segment 40 is rigidly arranged at the circumference of the Bakelite disc 32 which is driven by the shaft 8. At a small distance from the segment 40 a metal segment 41 is arranged, and at further distances metal segments 42—46. These metal segments are conductively connected, respectively, with contact pieces 47 to 52 on which the sliding segment 31 slides which is secured to the lever arm 30 and rotated by the shaft 28. Furthermore a ratchet disc 53 is rotatably mounted on the Bakelite disc 32 and screw-connected with a sliding contact 54 sliding along the contact pieces 55—61 to which the taps of a resistor 62 are connected, respectively. Furthermore a pawl 63 is connected with the lever 30 and engages the toothed rim of the ratchet disc 53. The pawl 63 is provided with a projection 64 lifted by a stop 65 rigidly attached to the disc 32 when the latter has been rotated far enough.

Figs. 3 to 3f show the various operating positions of the periodic current interrupter and the mode of operation of the resistance control devices described hereinabove when the number of revolutions exceeds or falls short of the predetermined value, and when the motor carries out jerky or abrupt movements due to speed fluctuations.

It will be seen from Fig. 3 how the motor is started. As soon as the stator (not shown) of the motor is energized the friction disc 15 rotates and thus also the friction wheel 16 which is secured to the shaft 28. The lever 30 carrying the sliding segment 31 is displaced in the clockwise direction whereas the armature 4 and the Bakelite disc 32 are still stationary. As soon as the two contacts 66 and 67 (shown in Fig. 3a) are bridged by sliding contact 31 the winding of the armature 4 connected by connections 4′ and 4″ to the contacts 66 and 67 is short-circuited so that the armature 4 is started. Thus the Bakelite disc 32 rigidly connected with the motor shaft 8 is rotated, and therefore the sliding contact 31 assumes a certain position on the Bakelite disc 32 which is dependent on the adjustment of the set number of revolutions, i.e. on the number of revolutions of the friction disc 16.

Fig. 3a shows the mode of operation of the control device under the assumption that the number of revolutions of the armature 4 is equal to that of the friction wheel 16. In this case the contact segments 40, 41, 42, 43 and 44 are connected with one another by the sliding segment 31 so that the armature 4 receives current pulses having a predetermined duration. The current pulses have a duration rendering just equal the numbers of revolutions per minute of the armature 4 and the friction disc 15. The winding of the armature 4 is short-circuited whenever the contact pieces 33 and 34 are bridged by the segments 40 to 44 because the winding of the armature 4 is connected with one end thereof to the resistor 62 whereas the other end is connected with the slip ring 10, and the brush 68 sliding on the slip ring 10 is connected with the contact segment 33 so that when the disc 32 rotates the segments 40—44 periodically contact the contact piece 34 which is conductively connected with the brush 69 sliding on the slip ring 9 to which the sliding contact 54 is connected, which is in contact with one of the contact pieces 55—61 connected to the taps of resistor 62.

Figure 3B:
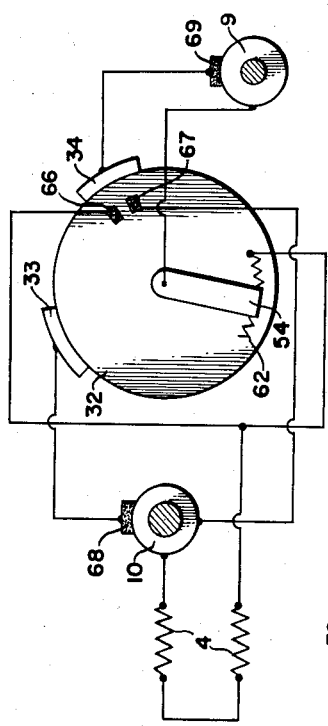
Fig. 3b is a wiring diagram of some parts of Figs. 3, 3a, 3c–3f.

Fig. 3b shows the corresponding wiring diagram which will be understood without further explanations.

Fig. 3c shows the regulating device when the speed of the motor exceeds that of the friction wheel 16. In this case the lever 30 is somewhat displaced to the left on the disc 32 so that now only the contact pieces 40, 41, 42 and 43 are bridged by the sliding contact 31 so that the pulses received by the armature 4 are shortened. Thus the number of revolutions of the armature 4 is automatically reduced.

Fig. 3d shows the regulating device when the motor is running too slowly as compared with the friction wheel 16. The Bakelite disc 32 is lagging behind the sliding contact 31 so that the latter has carried out a rotation toward the right and connects therefore more segments at the circumference of the Bakelite disc 32 with one another, actually the segments 40 to 45 being connected with one another. Therefore the pulses received by the armature 4 of the motor are lengthened so that the number of revolutions of the armature of the motor increases. Thus it will be understood that the number of revolutions of the armature 4 is always automatically adapted by the pulse control device to the set number of revolutions of the friction wheel 16.

Fig. 3e shows how the resistance regulating device operates. This device operates always when the armature 4 carries out jerky or abrupt motions caused by the existing pulses. At each jerky motion the ratchet disc 53 supported for rotation by the Bakelite disc 32 is moved by the pawl 63, it being clear that every time the arm 30 moves angularly, be it clockwise or counter-clockwise, a distance sufficient to cause the pawl 63 to engage a different tooth, the ratchet wheel 53 and with it the contact arm 54 will be advanced. Here, it will be observed that, during clockwise rotation of the arm 30 relative to the disk 32 and ratchet wheel 53, the latter will be advanced during the forward stroke, the pawl being ineffective on the backward stroke. Contrariwise, during counter-clockwise rotation of the arm 30 relative to the ratchet wheel 53, the initial stroke will be ineffective and it will not be until the arm 30 thereafter moves clockwise relative to the ratchet wheel 53 that the latter will be advanced. In other words, it does not matter whether the arm 30 moves ahead of or lags behind the disk 32 for, in either event, the ratchet wheel will ultimately be advanced. In consequence thereof the sliding contact 54 rigidly connected to the ratchet disc 53 is moved too so as to slide over the contact pieces 55 to 61. Thus the resistance value of the part of the resistor 62 which is connected to the circuit of the armature 4 is increased whenever the ratchet disc 53 is rotated by the pawl 63. As a result, the amplitude of the current pulses which can flow through the armature winding will due to the additional resistance now incorporated in the circuit, be reduced. In other words, a softer or gentler driving impulse will be imparted to the armature. This process is repeated every time a speed fluctuation occurs which is sufficient to rotate the ratchet disk 53 and arm 54 until the arm engages the next contact segment, e.g., is moved from, for example, segment 59 to segment 58. As soon as the proper resistance is incorporated in the armature circuit to produce a driving pulse of the desired magnitude, the system will settle down to a steady-state operation.

Fig. 3f illustrates the operation of the resistance regulating device if for any reason, e.g. owing to an increase of the load, the armature 4 is prevented by the series-connected resistor 62 from overcoming the load. The armature 4 lags in this case behind the friction disc until eventually the stop 65 comes to rest against the projection 64, thereby lifting the pawl 63 so that the ratchet disc 53 is rotated in opposite direction by a return spring 70 connected to the sliding contact 54, until the ratchet disc 53 reaches the initial position thereof. Thus the resistor 62 which had been connected in the armature circuit, is disconnected from the same so that the motor is enabled to overcome the increased load with full force and to adapt itself automatically to the latter.

Figure 4:
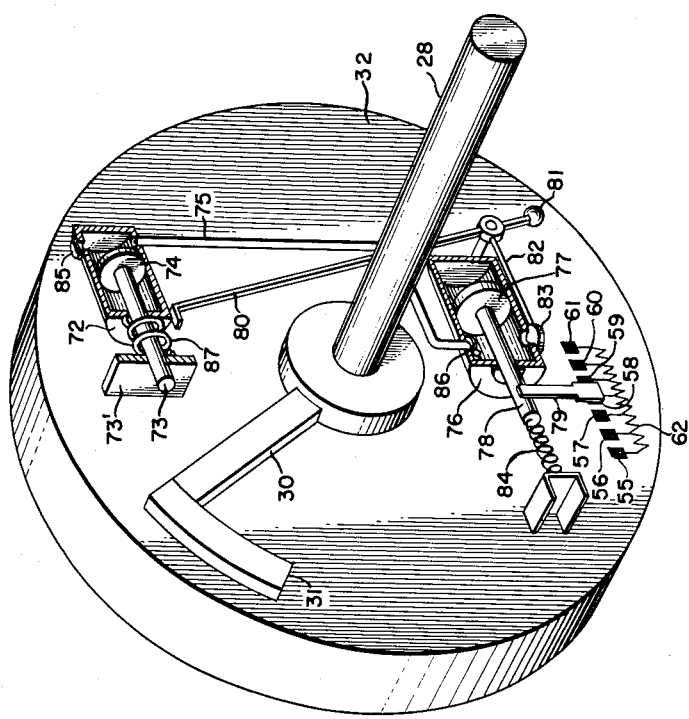
Fig. 4 is a perspective view on an enlarged scale of a part of Fig. 2 with some additional parts.

Fig. 4 shows another embodiment of the resistance regulating device in which the adjustment of the resistor is pneumatically effected. This device too is associated with Bakelite disc 32. A pneumatic pump 72 is actuated by the lever 30 rigidly connected with the shaft 28. As soon as the lever 30 carries out jerky motions the piston rod 73 of the pump 72 is displaced to the right. The piston 74 of the pump 72 is attached to the right end of the rod 73 and conveys air into a conduit 75 connected to a cylinder 76 in which a piston 77 is movably arranged so that it is moved to the right by the compressed air entering the cylinder 76 from the conduit 75. Thus it will be understood that at each jerky movement the piston 77 with the rod 78 and the sliding contact 79 attached to the same is moved toward the right. The sliding contact 79 cooperates with the contact pieces 55 to 61 to which the taps of the resistor 62 are connected. When the part of the resistor 62 connected to the circuit of the armature (not shown) becomes so large that the motor stops at a change of the load, thus generates an insufficient force, the lever 30 exerts a pressure on the rod 73 and actuates through a disc 73' attached thereto a rod 80 being pivoted about a pin 81. A transverse rod 82 is attached to the rod 80 and actuates a valve 83 which allows when opened the air pumped into the cylinder 76 to escape. The piston 77 is brought back to the initial position thereof by a spring 84 so that the sliding contact 79 is brought back to the initial position thereof in which the series resistor 62 connected in the armature circuit is switched off. The pneumatic control device is furthermore provided with a suction valve 85 arranged in the wall of the cylinder 72 and a pressure valve 86 arranged in the wall of the cylinder 76. By a compression spring 87 the piston rod 73 is brought back to the initial position thereof after each jerky motion of the lever 30.

The described embodiments illustrate only the fundamental principle of such a control device. Of course, also different devices could be provided, for instance a hydraulic device which operates in a similar manner as the pneumatic device described hereinabove. It is also possible to provide a separate small variable-speed motor, i.e. an adjusting motor which at each jerky motion of the lever 30 is switched on for a short moment and effects in this manner gradually the displacement of the sliding contact 79 until the resistor is adapted to the operating conditions of the motor.

Although several embodiments of the present invention have been herein illustrated and described, it will be evident to those skilled in the art that various modifications may be made in the details of the new system without departing from the principles herein set forth.

I claim:

1. An electro-magnetically controlled driving mechanism, comprising, in combination, a stator having a stator winding adapted to produce a magnetic field in said stator, a rotary armature arranged in said stator and having an armature winding, a member electrically connected with said armature winding and allowing the same to be energized by periodically interrupted current pulses, an armature shaft, a first control device controlling the number of revolutions per min. of said armature shaft, said first control device shortening said pulses when the number of revolutions of said armature shaft exceeds a predetermined value and lengthening said pulses when the number of revolutions of said armature shaft falls below said predetermined value, a second control device becoming operative whenever said armature carries out jerky motions about the positions corresponding to a continuous run at a constant speed, and resistor means connected with the circuit of said armature, said resistor means being controlled by said second control device and causing said armature to run continuously at constant speed.

2. A mechanism as claimed in claim 1, said stator winding producing a rotary magnetic field in said stator, and a short-circuit ring loosely arranged on said armature shaft and rotating synchronously with said rotary field produced in said stator winding so as to be taken along thereby, said first controlling device being driven by said short-circuit ring.

3. An electro-magnetically controlled driving mechanism comprising: a stator; a rotary armature cooperating with said stator and having an armature winding; and control means for periodically electrically connecting the terminals of said armature winding for predetermined intervals the length of which corresponds to the rotational speed of said armature, said control means including means for shortening the duration of said intervals when said armature exceeds a predetermined rotational speed and lengthening the duration of said intervals when said armature falls below said predetermined rotational speed, said control means further including means for connecting resistance means in series with said armature winding whenever the rotational speed of said armature fluctuates, thereby reducing the current which can flow through said armature winding and thus decreasing the magnitude of current pulses which may flow during the interval when said control means electrically connect the terminals of said armature winding by way of said resistance means.

No references cited.